3,699,091
PRODUCTION OF LARGE SURFACE AREA LIGNINS
Mitchell S. Dimitri, Charleston, S.C., and Alfred H. Nissan, Scarsdale, N.Y., assignors to Westvaco Corporation, New York, N.Y.
No Drawing. Filed Feb. 18, 1970, Ser. No. 12,433
Int. Cl. C07g 1/00
U.S. Cl. 260—124 R                                      4 Claims

ABSTRACT OF THE DISCLOSURE

A process for making large surface area lignins which comprises interspersing a barrier material, i.e., an ammonium salt, with lignin particles to reduce coalescence during drying, and spray drying the barrier material-lignin slurry. The barrier material, preferably added in at least a 2 to 1 ratio of barrier material to lignin, is removed during spray drying to produce lignin having a relatively large surface area. Barrier materials having decomposition temperatures above the spray drying temperature require removal subsequent to spray drying.

BACKGROUND OF THE INVENTION

This invention relates to an improved process for producing lignins having large surface areas. More specifically, the present invention relates to a process whereby the interspersion of barrier materials with lignin slurries reduces coalescence of the lignin particles during drying and the barrier material is removed by volatilization, decomposition or dissolving leaving lignin particles having relatively large surface areas.

Spray dried lignins made according to the process of this invention are lignins having larger surface areas than conventionally dried lignins. These large surface area lignins may be used in most areas applicable to conventionally dried lignins but in many instances they produce better results. For instance, the lignins of this invention are useful where a product is needed which will be dispersed easily. Other suggested uses for these large surface area lignins include ion exchange resins, and carrier for pesticides and adhesives. The large surface area of lignins made according to this process have advantages that are quite clear to those skilled in the art.

DESCRIPTION OF THE PRIOR ART

This invention has particular utility in connection with alkali lignin, i.e., lignin which is produced as a by-product of alkaline pulping using either the soda or the sulfate process, and chemical modifications of alkali lignin. During alkaline pulping the lignin is dissolved in the pulping liquor, known as black liquor, and the lignin is conventionally recovered therefrom by acid precipitation. Methods of recovering lignin from black liquor are well known and two of such methods are set forth in U.S. Pats. 3,048,576 and 2,997,466. Depending upon precipitation conditions, precipitated lignin may be in the form of free acid lignin or a lignin salt. If lignin is precipitated at a pH of about 9 to 10, it is obtained in the form of a salt; whereas, if lignin is precipitated at a pH of about 2 to 5, or if lignin precipitated at a high pH is acid washed so as to be substantially free of salt, free acid lignin is obtained.

Precipitated lignin is concentrated to form a cake containing about 50% to 60% water which is then dried, generally by spray drying. Lignin has been spray dried for over twenty years and this method has produced an economical, easily handled product. The lignins obtained by conventional processes have surface areas averaging 1 to 5 square meters per gram and while these lignins are adequate for the purposes intended, they do not have the large surface area of lignins made by the process of this invention. U.S. Pat. 3,223,697 discloses lignin particles having surface areas of 18 to 32 square meters per gram. Although these powdered, precipitated lignin particles are of extremely small size and of larger than conventional surface area, even they do not approach the outstanding surface area and characteristics of lignins made according to the process of this invention.

It is an object of this invention to provide a process for producing large surface area lignins by spray drying. Another object of this invention is to produce large surface area lignins by a reduction of coalescence during drying. Further objects, features and advantages of this invention are disclosed and illustrated below.

SUMMARY OF THE INVENTION

It has been found that when a lignin slurry and a barrier material are mixed prior to spray drying that the barrier material serves to reduce coalescence during drying thereby producing large surface area. It has been found that ammonium salts are particularly effective barrier materials. The barrier material is mixed with either a lignin solution or slurry of precipitated lignin at a ratio of at least 2 parts barrier material to 1 part lignin. If the barrier material is added to a lignin solution, the lignin is then precipitated to form a slurry. The barrier material and lignin slurry are thoroughly mixed and then spray dried forming lignins having relatively large surface areas. Barrier materials with decomposition temperatures within those of the spray dryer operating temperatures are decomposed or sublimed by the heat from normal spray drying. Barrier material having a decomposition temperature higher than the spray drying temperature may be removed by subsequent heating or dissolving.

DETAILED DESCRIPTION OF THE INVENTION

Experimentation with lignin precipitation and drying, particularly by observing the product with an electron microscope, has led to the hypothesis that coalescence of a lignin particle with other lignin particles tends to occur as water is removed during drying. Precipitated lignin in a concentrated aqueous slurry exists as a water-swollen gel. It appears that during drying the gel entity shrinks and collapses any incipient internal passages because of powerful surface tension forces and the nature of the lignin particle and coalesces with adjacent particles. It is, therefore, believed that a means of preventing coalescence of adjacent lignin particles will produce lignins having large surface areas.

All soluble lignins which can be precipitated may be treated according to the process of this invention and certain modified forms of lignin show striking superiority to free acid lignin. The term "lignin" as used herein has reference to alkali lignin or modified forms thereof, such as those mentioned below, and other recovered lignins having equivalent properties and characteristics. The lignins employed in this invention are those lignins which are soluble in water or ammonium hydroxide, but which are insoluble in either the free acid form or in the form of polyvalent salts. The lignin solution should be kept between 5% and 20% solids content in order to precipitate particles of 150–250 A. Additionally, slurries having solids contents above about 20% are difficult to thoroughly mix with the barrier material because of the high viscosity of the slurry. While this invention is generally practiced using alkali lignin as it normally occurs, the lignin used may be modified so long as it is soluble and is susceptible to precipitation. The lignin may be chemically modified in other respects. In the preferred practice of this invention the lignin solution from which the lignin is precipitated is an aqueous solution of the alkali metal salts or ammonium salt of lignin. Especially successful results have been obtained with hexamethylene tetramine modified lignins.

The barrier material may be a solid when dried that can be volatilized or dissolved by thermal or chemical means. The preferred barrier materials are the salts of ammonia which decompose, sublimate or volatilize with heat. In certain instances more than one barrier material is used in practicing this invention. Typical salts are listed below with their approximate removal temperatures.

| Salt: | Temperature, °F. |
|---|---|
| Ammonium carbonate | 137 |
| Ammonium chloride | 635 |
| Ammonium sulfate | 536 |
| Ammonium sulfamate | 320 |

The barrier material may be mixed with either the lignin solution or with the lignin slurry after the lignin has been precipitated. The lignin if in solution is, of course, precipitated before drying. The barrier material to lignin ratio is most effective above 2:1 and below 10:1. Any lignin precipitating agent may be employed that may be introduced into a lignin solution. Mineral acids such as sulfurous acid are preferred. Also, organic acids such as acetic, oxalic, formic and acrylic acid may be used. Other precipitants include such acid-forming gases as carbon dioxide, sulfur dioxide and hydrogen chloride. The function of the acid is that of reducing the pH of the lignin solution to a point where the lignin precipitates, and for this reason the choice of the acid employed is largely dictated by considerations of economy. In the process of this invention, the pH of any lignin slurry containing small particles should be between 1 and 10, preferably between 4 and 8.

The barrier material and the lignin slurry are agitated normally for about one-half hour to intersperse the barrier material-lignin slurry. The barrier material-lignin slurry is then spray dried. The spray dryer inlet gas temperature is preferably about 300° F. because higher temperatures may cause the formation of larger particles by melting. The dryer outlet gas temperature is fixed at about 200° F. because at this temperature the moisture content of the dried product is about 4–7%. Below a dryer outlet temperature of about 150° F. wet product will tend to build up in the dryer.

The typical procedure of this invention is as follows: (1) a lignin solution is diluted with water until the lignin concentration is between 5–20%; (2) a barrier material, for instance, ammonium carbonate, is added to the lignin solution while the solution is being agitated; (3) agitation is continued for 30 minutes; (4) $CO_2$ is added to precipitate the lignin and to bring the acidity to the preferred level of pH between 4 and 8 while agitation is continued; (5) the slurry is further agitated and then screened through a 100 mesh screen to remove oversize lumps; (6) the slurry is spray dried at 300° F. inlet and 200° F. outlet dryer temperatures; and (7) the dried product may then be heated in a forced convection dryer to 450–500° F. to remove the remaining barrier material, if any.

The typical lignin products of this process are porous, agglomerated spheres in clusters tightly bound at their points of contact. Crevices and capillaries abound, greatly increasing the surface area of the material. Lignins precipitated and spray dried without a barrier material have surface areas that seldom exceed 5 square meters per gram; whereas, with the treatment of this invention the average surface area of lignin particles may be well above 65 square meters per gram. The surface area of the lignins has been determined by the Brunauer-Emmet-Teller (BET) method using nitrogen adsorption, and whenever the term "surface area" is referred to, it is the surface area as determined by the BET method.

The following examples illustrate the process of this invention.

EXAMPLE 1

To illustrate the effect of varying the barrier material to lignin ratio, a hexamethylene tetramine modified lignin was spray dried with ammonium carbonate as the barrier material following the typical procedure set forth above. Surface area and pore size distribution of the samples of the spray dried lignin were made and electron micrographs were prepared where necessary to determine particle configuration. The results are shown in the table below.

| Run No. | Ammonium carbonate as percent lignin weight | Surface area (m.²/gm.) |
|---|---|---|
| 1 | None | 1.0 |
| 2 | 50 | 3.1 |
| 3 | 100 | 7.3 |
| 4 | 200 | 84.4 |

The significant result here is that the barrier material principle appears valid. The surface area of a lignin spray dried with a 2:1 ratio of barrier material to lignin (Run No. 4) was significantly higher than a conventionally spray dried lignin as shown by Run No. 1. Electron microscope photographs showed increasing porosity of the lignin product as the ratio of ammonium carbonate increased. Increasing porosity indicated the disappearance of much of the barrier material without additional heat treatment. This was caused by the relatively low decomposition temperature of ammonium carbonate (137° F.) which was near the dryer wet bulb temperature of 125° F.

EXAMPLE 2

A sample of hexamethylene tetramine lignin solution used in Example 1 was precipitated with carbon dioxide to a pH of 9.7, and diluted with water to a concentration of 8.0% lignin solids. The lignin slurry without barrier material was then spray dried and produced a tan lignin powder similar to the product of Example 1. Surface area measurements indicated negligible surface area.

EXAMPLE 3

A barrier material solution containing 6 pounds of ammonium carbonate, 6 pounds of ammonium chloride and 38.3 pounds of waters was added with agitation to 21.7 pounds of a lignin solution containing 3.0 pounds of a hexamethylene tetramine modified lignin. Agitation was continued for 30 minutes, the mixture precipitated with $CO_2$ and spray dried. The dried lignin product was then placed in trays and heated at 440° F. in a forced air convection oven for 2.75 hours. The surface area was found to be 85.6 m.²/g.

EXAMPLE 4

A solution of 12 pounds of ammonium sulfamate in 30 pounds of water was added to 30 pounds of a solution containing 3 pounds of ammonium lignate. After one-half hour agitation the lignin solution was precipitated with $CO_2$ and spray dried. The spray dried lignin was then heated for one hour at 390° F. and one hour at 350° F. The lignin had a surface area of 12.2 m.²/g.

EXAMPLE 5

To show the effectiveness of ammonium salts having a decomposition temperature higher than ammonium carbonate several compounds and combinations were tried. The approach selected was to precipitate the lignin, add the barrier material, spray dry the barrier material-lignin slurry and heat treat the large surface area lignin obtained to remove the dried barrier material. The spray dryer inlet temperature was 350° F. and the outlet temperature was 200° F. The removal of the barrier material after spray drying was complete and gave a more porous, fragile structure than obtained with ammonium carbonate alone. The heat treating step was carried out in a forced convection oven at temperatures up to 500° F. Although complete decomposition of all barrier materials did not occur, a substantial portion was removed by the additional heating. The 500° F. upper temperature limit was selected because charring or burning of the lignin occurs above this point.

The table below presents the data obtained using various ammonium salts and combinations as barrier materials.

PHYSICAL PROPERTIES OF LIGNINS PRODUCED WITH HIGH REMOVAL TEMPERATURE AMMONIUM SALTS

| Run Number | 1 | 2[1] | 3 | 4 | 5 |
|---|---|---|---|---|---|
| Lignin type [2] | Hexa | Hexa | Hexa | Hexa | $NH_4$ |
| pH | 8.8 | 8.6 | 9.1 | 9.0 | 9.6 |
| Lignin solids, percent | 13.8 | 13.8 | 13.8 | 13.8 | 10.0 |
| Barrier material, #1 | $(NH_4)_2CO_3$ | $(NH_4)_2CO_3$ | $(NH_4)_2CO_3$ | $(NH_4)_2CO_3$ | $NH_4 NH_2 SO_3$ |
| Barrier material, #2 | $NH_4Cl$ | $NH_4Cl$ | $(NH_4)_2SO_3$ | $(NH_4)_2SO_3$ | |
| Lignin ratio #1 | 2 | 2 | 2 | 2 | 4 |
| Lignin ratio #2 | 2 | 4 | 2 | 4 | |
| Dryer feed solids, percent | 5.0 | 5.0 | 6.2 | 7.0 | |
| Cyclone product, lbs | 4.8 | 9.2 | | 11.5 | |
| Collector product, lbs | 3.0 | 3.8 | | 3.7 | 8.4 |
| Cyclone recovery, percent | 61.5 | 70.8 | | 75.2 | |
| Collector recovery, percent | 38.5 | 29.2 | | 24.8 | 100 |
| Cyclone, surface area, m.²/gm | 85.6 | 33.5 | | 31.7 | |
| Collector, surface area, m.²/gm | 77.3 | 35.7 | 21.7 | | 12.6 |

[1] All runs except Run No. 2 were subjected to subsequent heat treatment.
[2] "Hexa" refers to hexamethylene tetramine modified lignim.

Electron microscope photographs taken of the spray dried lignin-barrier material being heated on a special microscope stage showed beyond a doubt that the spheres become more porous as ammonium chloride was removed at the higher temperatures. Porosity increased as the barrier was removed. Shrinkage of the spheres also occurred as the temperature level was raised and the diameter of the spheres was reduced by approximately 10–15%. Some of the shrinkage noted may have been due to the higher melting point of hexamethylene tetramine lignin, which shrinks somewhat around 500° F. No substantial disintegration of the structures was noted even though the temperature was raised to the various levels in a matter of seconds. Some small debris could be seen at the higher temperature levels suggesting some internal stresses or forces may have expelled pieces from the main body.

While this invention has been described and illustrated herein by reference to various specific materials, procedures, and examples, it is understood that the invention is not restricted to the particular materials, combinations of materials, and procedures selected for that purpose. Numerous variations of such details can be employed, as will be appreciated by those skilled in the art.

The invention having been described, what is claimed is:

1. A process for producing alkali lignin having a large surface area which comprises, adding an ammonium salt to an alkali lignin solution from the group consisting of metal lignates, formaldehyde modified lignins and hexamethylene tetramine modified lignins to form a slurry, said ammonium salt being present in at least a 2 to 1 ratio of ammonium salt to lignin slurry, thoroughly mixing said lignin slurry with said ammonium salt, and drying said mixture.

2. The process of claim 1 wherein said ammonium salt is a member of the group consisting essentially of ammonium carbonate, ammonium chloride, ammonium sulfate, ammonium, sulfite, ammonium, sulfanate and mixtures thereof.

3. The process of claim 1 wherein said dried mixture is heated to temperatures approaching or exceeding the decomposition temperature of said ammonium salt until said ammonium salt has been substantially removed.

4. The process of claim 1 wherein said ammonium salt is added to a precipitated lignin slurry.

References Cited

UNITED STATES PATENTS 2,865,906   12/1958   Höye _____ 260—124 C

LEWIS GOTTS, Primary Examiner

D. R. PHILLIPS, Assistant Examiner

UNITED STATES PATENT OFFICE
CERTIFICATE OF CORRECTION

Patent No. 3,699,091　　　　　　　　　Dated October 17, 1972

Inventor(s) Mitchell S. Dimitri et al

It is certified that error appears in the above-identified patent and that said Letters Patent are hereby corrected as shown below:

Claim 2, line 4, after "ammonium" (first occurence) delete -- , --; after "ammonium" (second occurence) delete -- , --; and same line "sulfanate" should be -- sulfamate --.

Signed and sealed this 10th day of April 1973.

(SEAL)
Attest:

EDWARD M. FLETCHER, JR.　　　　　　　　ROBERT GOTTSCHALK
Attesting Officer　　　　　　　　　　　Commissioner of Patents